(12) United States Patent
Shargots et al.

(10) Patent No.: US 9,721,681 B2
(45) Date of Patent: Aug. 1, 2017

(54) INTEGRAL PRESSURIZED WATER REACTOR WITH COMPACT UPPER INTERNALS ASSEMBLY

(71) Applicant: Babcock & Wilcox mPower, Inc., Charlotte, NC (US)

(72) Inventors: Scott J Shargots, Forest, VA (US); Matthew W Ales, Forest, VA (US); Michael S Berthold, Holly Springs, NC (US)

(73) Assignee: BWXT MPOWER, INC., Charlotte, NC (US)

( * ) Notice: Subject to any disclaimer, the term of this patent is extended or adjusted under 35 U.S.C. 154(b) by 1026 days.

(21) Appl. No.: 13/863,659

(22) Filed: Apr. 16, 2013

(65) Prior Publication Data
US 2013/0301776 A1    Nov. 14, 2013

Related U.S. Application Data

(60) Provisional application No. 61/625,491, filed on Apr. 17, 2012.

(51) Int. Cl.
*G21C 1/32* (2006.01)
*G21C 7/08* (2006.01)
(Continued)

(52) U.S. Cl.
CPC .............. *G21C 7/08* (2013.01); *G21C 7/12* (2013.01); *G21C 13/02* (2013.01); *G21C 1/322* (2013.01);
(Continued)

(58) Field of Classification Search
CPC .......... G21C 1/32; G21C 1/322; G21C 13/02; G21C 19/19; G21C 13/024; G21C 5/10
(Continued)

(56) References Cited

U.S. PATENT DOCUMENTS 3,015,616 A    1/1962    Stuartz et al.
3,212,978 A    10/1965    Short et al.
(Continued)

FOREIGN PATENT DOCUMENTS

CN    1515011 A    7/2004
CN    102257575 A    11/2011
(Continued)

OTHER PUBLICATIONS

Halfinger, "The B&W mPOWER Scalable, Practical Nuclear Reactor Design", Nuclear Technology, vol. 178, May 2012.*
(Continued)

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

An integral pressurized water reactor (PWR) comprises: a cylindrical pressure vessel including an upper vessel section and a lower vessel section joined by a mid-flange; a cylindrical central riser disposed concentrically inside the cylindrical pressure vessel and including an upper riser section disposed in the upper vessel section and a lower riser section disposed in the lower vessel section; steam generators disposed inside the cylindrical pressure vessel in the upper vessel section; a reactor core comprising fissile material disposed inside the cylindrical pressure vessel in the lower vessel section; and control rod drive mechanism (CRDM) units disposed inside the cylindrical pressure vessel above the reactor core and in the lower vessel section. There is no vertical overlap between the steam generators and the CRDM units.

20 Claims, 6 Drawing Sheets

(51) Int. Cl.
*G21C 7/12* (2006.01)
*G21C 13/02* (2006.01)
*G21C 19/19* (2006.01)

(52) U.S. Cl.
CPC .............. G21C 19/19 (2013.01); Y02E 30/32 (2013.01); Y02E 30/39 (2013.01)

(58) Field of Classification Search
USPC .................................................. 376/347, 406
See application file for complete search history.

(56) References Cited

U.S. PATENT DOCUMENTS

| | | |
|---|---|---|
| 3,379,619 A | 4/1968 | Andrews et al. |
| 3,527,670 A | 9/1970 | Winders |
| 3,607,629 A | 9/1971 | Frisch et al. |
| 3,650,895 A | 3/1972 | Sodergard |
| 3,734,825 A | 5/1973 | Schabert et al. |
| 3,853,699 A | 12/1974 | Frisch et al. |
| 3,853,702 A | 12/1974 | Bevilacqua et al. |
| 3,857,599 A | 12/1974 | Jones et al. |
| 3,959,072 A | 5/1976 | Dupen |
| 4,057,467 A | 11/1977 | Kostrzewa |
| 4,072,563 A | 2/1978 | McDonald et al. |
| 4,124,442 A | 11/1978 | Zhuchkov et al. |
| 4,175,004 A | 11/1979 | Jabsen |
| 4,187,145 A | 2/1980 | Noyes et al. |
| 4,219,386 A | 8/1980 | Osborne et al. |
| 4,231,843 A | 11/1980 | Myron et al. |
| 4,235,674 A | 11/1980 | Yue |
| 4,252,613 A | 2/1981 | Jabsen |
| 4,313,797 A | 2/1982 | Attix |
| 4,420,456 A | 12/1983 | Nickel et al. |
| 4,472,348 A | 9/1984 | Desfontaines |
| 4,484,093 A | 11/1984 | Smith |
| 4,562,038 A | 12/1985 | Assedo et al. |
| 4,569,705 A | 2/1986 | Allan |
| 4,598,738 A | 7/1986 | Weber et al. |
| 4,618,471 A | 10/1986 | Defaucheux et al. |
| 4,640,811 A | 2/1987 | Peletan |
| 4,663,576 A | 5/1987 | Scarola et al. |
| 4,678,623 A | 7/1987 | Malandra et al. |
| 4,681,728 A | 7/1987 | Veronesi et al. |
| 4,683,106 A | 7/1987 | Jahnke |
| 4,687,628 A | 8/1987 | Gillett et al. |
| 4,759,904 A | 7/1988 | Gillett et al. |
| 4,762,669 A | 8/1988 | Doshi |
| 4,857,265 A | 8/1989 | Pol et al. |
| 4,902,468 A | 2/1990 | Veronesi et al. |
| 4,963,318 A | 10/1990 | Johansson et al. |
| 4,975,239 A | 12/1990 | O'Neil et al. |
| 4,983,351 A | 1/1991 | Tower et al. |
| 4,986,954 A | 1/1991 | Feurgard |
| 5,006,305 A | 4/1991 | Denizou |
| 5,024,808 A | 6/1991 | Land et al. |
| 5,183,628 A | 2/1993 | Baujat et al. |
| 5,207,978 A | 5/1993 | Barbe |
| 5,237,595 A | 8/1993 | Woodcock |
| 5,241,570 A | 8/1993 | Challberg |
| 5,276,719 A | 1/1994 | Batheja et al. |
| 5,328,667 A | 7/1994 | Johnson |
| 5,361,279 A | 11/1994 | Kobsa et al. |
| 5,386,440 A | 1/1995 | Kashiwai et al. |
| 5,715,288 A | 2/1998 | Matteson |
| 5,844,958 A | 12/1998 | Leroux et al. |
| 5,930,321 A | 7/1999 | Harkness et al. |
| 6,097,779 A | 8/2000 | Challberg et al. |
| 6,130,927 A | 10/2000 | Kang et al. |
| 6,167,104 A | 12/2000 | Garzarolli et al. |
| 6,275,557 B2 | 8/2001 | Nylund et al. |
| 6,477,219 B2 | 11/2002 | Hirukawa et al. |
| 6,489,623 B1 | 12/2002 | Peters et al. |
| 6,636,578 B1 | 10/2003 | Clark |
| 6,636,580 B2 | 10/2003 | Murakami et al. |
| 6,819,733 B2 | 11/2004 | Broders et al. |
| 6,865,242 B2 | 3/2005 | Barbe et al. |
| 7,085,340 B2 | 8/2006 | Goldenfield et al. |
| 7,257,185 B1 | 8/2007 | Yamada et al. |
| 7,289,590 B2 | 10/2007 | Joly et al. |
| 7,453,972 B2 | 11/2008 | Hellandbrand, Jr. et al. |
| 7,561,654 B2 | 7/2009 | Makovicka et al. |
| 7,668,280 B2 | 2/2010 | Hellandbrand, Jr. et al. |
| 7,668,284 B2 | 2/2010 | Sparrow et al. |
| 7,672,418 B2 | 3/2010 | Aktas et al. |
| 8,102,961 B2 | 1/2012 | Aktas et al. |
| 9,082,519 B2 | 7/2015 | Weisel et al. |
| 9,336,908 B2 * | 5/2016 | Shargots ................. G21C 1/32 |
| 2002/0176529 A1 | 11/2002 | Aoki et al. |
| 2006/0207672 A1 | 9/2006 | Henriksson et al. |
| 2006/0222140 A1 | 10/2006 | Aleshin et al. |
| 2008/0145174 A1 | 6/2008 | Suzuki et al. |
| 2008/0253497 A1 | 10/2008 | Singleton et al. |
| 2008/0279326 A1 | 11/2008 | Gilmore et al. |
| 2009/0060114 A1 | 3/2009 | Defilippis |
| 2010/0150294 A1 | 6/2010 | Weisel et al. |
| 2010/0316177 A1 | 12/2010 | Stambaugh et al. |
| 2010/0316181 A1 | 12/2010 | Thome et al. |
| 2011/0222640 A1 | 9/2011 | Desantis |
| 2012/0014493 A1 | 1/2012 | Frank et al. |
| 2012/0051482 A1 | 3/2012 | Shargots et al. |
| 2012/0069947 A1 | 3/2012 | Ketcham et al. |
| 2012/0076254 A1 | 3/2012 | Malloy et al. |
| 2012/0099691 A1 | 4/2012 | Shargots et al. |
| 2014/0321598 A1 * | 10/2014 | Ales ....................... G21C 1/322 376/406 |

FOREIGN PATENT DOCUMENTS

| | | |
|---|---|---|
| JP | 62-044686 A | 2/1987 |
| JP | 01-147396 A | 6/1989 |
| JP | 2004061191 A | 2/2004 |
| TW | 255969 B | 9/1995 |
| TW | 200845042 A | 11/2008 |
| WO | 2012047438 | 4/2012 |

OTHER PUBLICATIONS

European Search Report dated Mar. 14, 2016, for European Patent Application No. 13777652.2.
International Search Report and Written Opinion for PCT/US2013/036756 dated Sep. 17, 2013.
Office Action dated Feb. 14, 2016 for Chinese Application No. 201380031829.1.
European Search Report dated Nov. 20, 2015 for European Application No. 13777652.2.

* cited by examiner

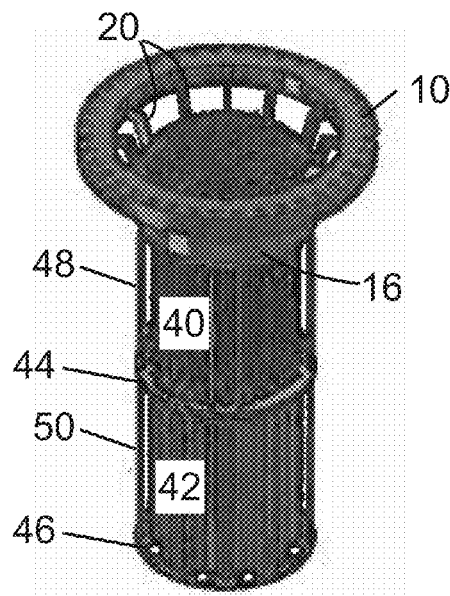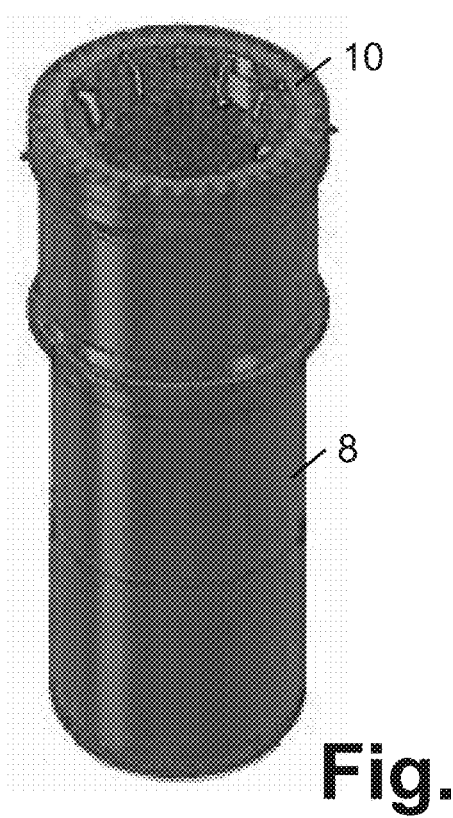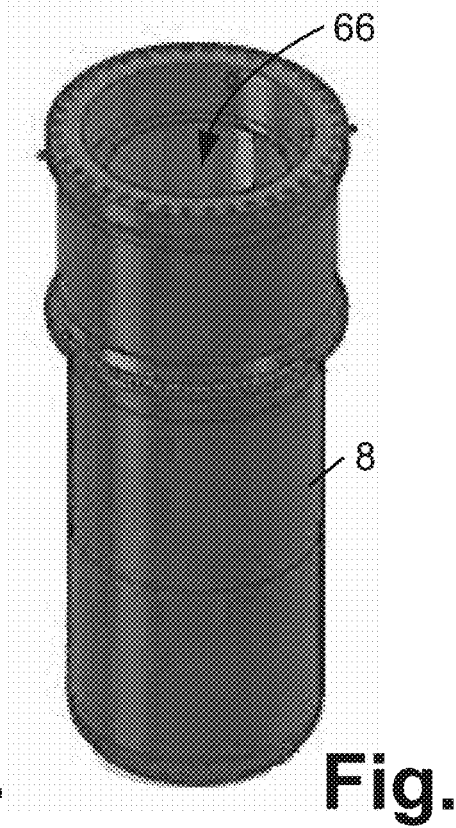
Fig. 4　　　　Fig. 5

INTEGRAL PRESSURIZED WATER REACTOR WITH COMPACT UPPER INTERNALS ASSEMBLY

This application claims the benefit of U.S. Provisional Application No. 61/625,491 filed Apr. 17, 2012. U.S. Provisional Application No. 61/625,491 filed Apr. 17, 2012 is hereby incorporated by reference in its entirety.

BACKGROUND

The following relates to the nuclear power arts, nuclear reaction control arts, and related arts.

Pressurized water reactor (PWR) designs have certain benefits over other light water reactor designs such as boiling water reactor (BWR) designs. For example, a PWR does not include complex steam separation hardware in the upper portion of the reactor vessel. In conventional PWR designs, this has allowed the control rod assemblies (CRAs) to penetrate the reactor through the top of the pressure vessel with the control rod drive mechanism (CRDM) units mounted externally above the pressure vessel. In this arrangement, a vessel penetration passing a connecting rod occurs at the top of the pressure vessel, whereas in a BWR design such penetrations are at the bottom of the pressure vessel, and in some design even below the reactor core itself.

In some planned small modular reactor (SMR) designs, it is contemplated to improve upon the conventional reactor design by locating the entirety of the CRDM units inside the pressure vessel. See Stambaugh et al., U.S. Pub. No. 2010/0316177 A1; Desantis, U.S. Pub. No. 2011/0222640 A1; Stambaugh et al., WO 2010/144563 A1; and Thome et al., U.S. Pub. No. 2010/0316181 A1; all of which are incorporated herein by reference in their entireties. This arrangement eliminates mechanical vessel penetrations entirely, replacing them with electrical and/or hydraulic penetrations to drive the internal CRDM units. In some such SMR designs, it is further contemplated to employ a so-called "integral" PWR configuration in which the steam generators are also located inside the pressure vessel. See Thome et al., U.S. Pub. No. 2010/0316181 A1 which is incorporated herein by reference in its entirety.

An integral PWR with internal CRDM units places a substantial number of components inside the pressure vessel. The internal steam generators need to have sufficient height to controllably convert inlet feedwater to steam. The control rod system must also have substantial height: The motors of the CRDM units must be located at least the full length of the control rods above the reactor core to allow full rod retraction, and a similar clearance must be provided above the motors to accommodate the connecting rods when the control rods are fully retracted.

Thome et al., U.S. Pub. No. 2010/0316181 A1, which is incorporated herein by reference in its entirety, leverages the conventional arrangement of a central riser surrounded by a downcomer annulus to achieve a compact integral PWR configuration including internal CRDM units. The steam generators are located in the downcomer annulus, while the CRDM units are located inside the central riser. This enables substantial vertical overlap between the steam generators and the CRDM units, providing a more compact SMR design.

BRIEF SUMMARY

In one aspect of the disclosure, an apparatus comprises: a cylindrical pressure vessel including an upper vessel section and a lower vessel section joined by a mid-flange; a cylindrical central riser disposed concentrically inside the cylindrical pressure vessel and including an upper riser section disposed in the upper vessel section and a lower riser section disposed in the lower vessel section; a reactor core comprising fissile material disposed inside the cylindrical pressure vessel in the lower vessel section; and control rod drive mechanism (CRDM) units controlling control rod insertion into the reactor core. The CRDM units are disposed inside the cylindrical pressure vessel above the reactor core and in the lower vessel section with no vertical overlap between the upper vessel section and the CRDM units.

In another aspect of the disclosure, an apparatus comprises: a cylindrical pressure vessel including an upper vessel section and a lower vessel section joined by a mid-flange; a cylindrical central riser disposed concentrically inside the cylindrical pressure vessel and including an upper riser section disposed in the upper vessel section and a lower riser section disposed in the lower vessel section; steam generators disposed inside the cylindrical pressure vessel in the upper vessel section; a reactor core comprising fissile material disposed inside the cylindrical pressure vessel in the lower vessel section; and control rod drive mechanism (CRDM) units disposed inside the cylindrical pressure vessel above the reactor core and in the lower vessel section. There is no vertical overlap between the steam generators and the CRDM units.

In another aspect of the disclosure, a method is disclosed, which is suitably performed in conjunction with the apparatus of either one of the two immediately preceding paragraphs. The method comprises disconnecting the upper vessel section from the mid-flange, and removing the upper vessel section without lifting the upper vessel section over any portion of the CRDM units. The method may further include disconnecting the mid-flange from the lower vessel section, and removing the mid-flange and the CRDM units from the lower vessel section with the CRDM units hanging suspended from the mid-flange.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 4 shows a perspective view of the lower vessel section and mid-flange of the integral PWR of FIG. 1 with the upper vessel section removed.

FIG. 5 shows a perspective view of the mid-flange and suspended upper internals lifted out of the lower vessel section of the integral PWR of FIG. 1.

DETAILED DESCRIPTION OF THE PREFERRED EMBODIMENTS

Figure 1:
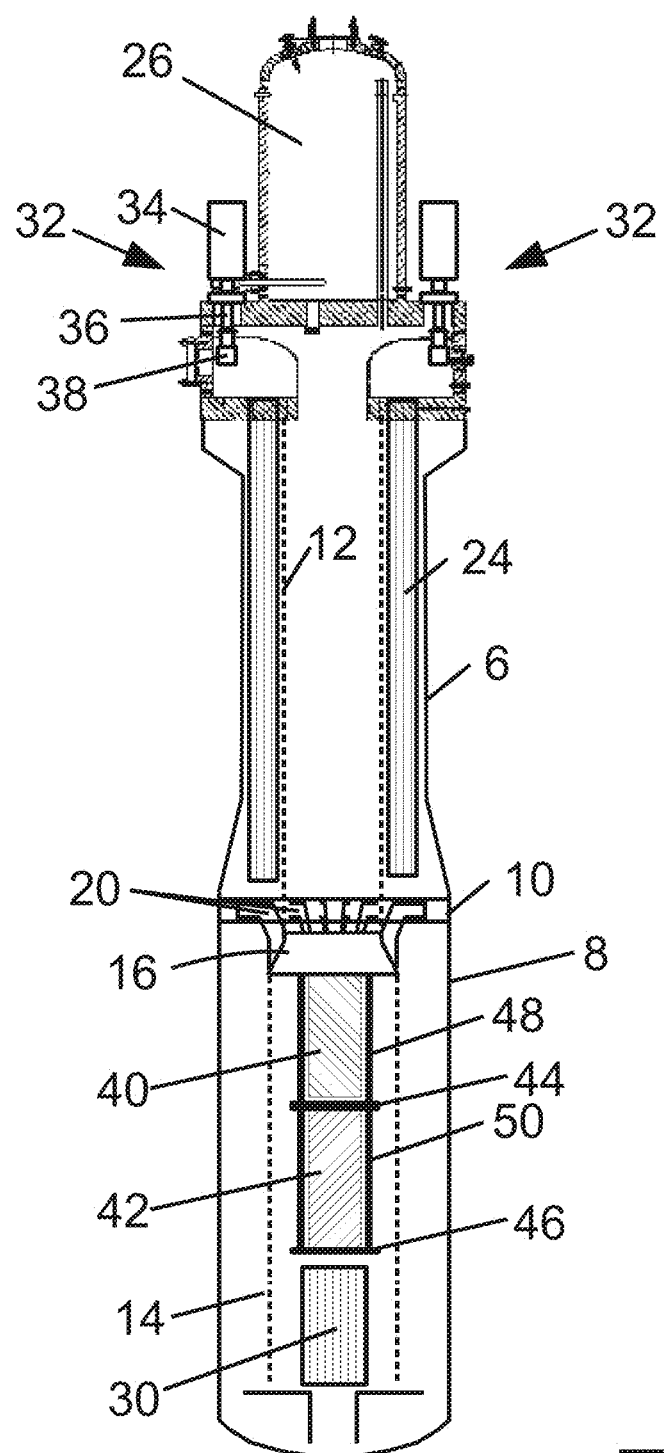
FIG. 1 diagrammatically shows a side sectional view of an integral pressurized water reactor (PWR) including a reactor core comprising fissile material disposed in a pressure vessel, with upper internals including internal control rod drive mechanism (CRDM) units and control rod guide frames mounted in suspended fashion from a mid-flange of the pressure vessel.

Disclosed herein are small modular reactor (SMR) designs employing an integral pressurized water reactor (integral PWR) configuration with internal control rod drive mechanism (CRDM) units. The approaches disclosed herein provide substantial operational benefits. The disclosed integral PWR designs do not include any vertical overlap between the steam generators or the upper vessel, on the one hand, and the CRDM units located in the lower vessel on the other hand. The disclosed designs establish a complete separation of components into: (1) an upper vessel section that includes the steam generators but not the CRDM units; and (2) a lower vessel section that includes the CRDM units but not the steam generators. The steam generators do not extend downward into the lower vessel, and conversely the CRDM units do not extend upward into the upper vessel.

This disclosed configuration has substantial benefits. During an opening of the reactor vessel for refueling, maintenance, inspection, or other purposes, the upper vessel section including the steam generators can be lifted off and moved laterally without raising it above an overlapping portion of the CRDM units. This allows the height of the containment structure to be reduced. Further, by placing the CRDM units entirely in the lower vessel, more of the total vessel height can be accommodated by the lower vessel as compared with the upper vessel. Said another way, for a given total pressure vessel height, the disclosed designs enable the lower vessel to be made relatively taller and the upper vessel relatively shorter. The reduced upper vessel height translates into reduced weight as well, which further facilitates upper vessel removal.

During refueling, the upper internals (including the internal CRDM units and control rod guide frames) must be removed to gain access to the reactor core located at or near the bottom of the lower vessel section. The disclosed configuration suspends the upper internals from a "mid-flange" which is located above the upper internals and at the juncture between the upper and lower vessel sections. With this configuration, and after removal of the upper vessel section, a crane or other robotic lifting apparatus can connect with the mid-flange and lift the upper internals out of the lower vessel as a single-piece unit suspended from the mid-flange in order to provide access to the reactor core from above. Because the upper internals are suspended from and hang below the mid-flange which is providing the anchor point for lifting out the upper internals, there is no tendency for the upper internals to tilt.

In some embodiments, all power and control lines for the CRDM units are brought in through the mid-flange. In this case, internal connections running from the mid-flange to the CRDMs can be left connected when the upper internals are lifted out of the lower vessel. Indeed, if a dedicated robotic assembly is available then the upper internals can be lifted out and moved to a storage/maintenance bay inside containment, and can be inspected and any indicated maintenance performed while the upper internals remain connected to the robotic assembly used in their removal.

With reference to FIG. 1, an illustrative integral PWR includes a cylindrical pressure vessel including an upper vessel section 6 and a lower vessel section 8 joined by a mid-flange 10. A cylindrical central riser is disposed concentrically inside the cylindrical pressure vessel and includes an upper riser section 12 disposed in the upper vessel section 6, a lower riser section 14 disposed in the lower vessel section 8, and a riser transition section 16 connecting the upper riser section 12 and the lower riser section 14. To distinguish the components, the upper and lower riser sections 12, 14 are shown in dashed lines in FIG. 1 while the riser transition section 16 is shown in solid lines in FIG. 1. The riser transition section 16 is connected to the mid-flange 10, in the illustrative embodiment by gussets 20 having first ends welded to the mid-flange 10 and second ends welded to the riser transition section 16. In the illustrative embodiment, the gussets 20 are angled downward such that the riser transition section 16 is disposed below the mid-flange 10.

As used herein, the modifier "cylindrical" is intended to denote a generally cylindrical element, and allows for some deviation from a mathematically perfect cylinder. For example, the illustrative pressure vessel of FIG. 1 has a generally narrower upper vessel section 6 as compared with the lower vessel section 8, with the upper vessel section 6 expanding near its connection with the mid-flange 10. Similarly the illustrative upper riser section 12 is smaller-diameter than the lower riser section 14, and the riser transition section 16 includes a frusto-conical portion to accommodate this diameter difference. Moreover, the cylindrical pressure vessel includes various vessel penetrations and other deviations from perfect cylinder.

As used herein, the term "vertical" and references to "above" and "below" assume that the pressure vessel is positioned "vertically" with the upper vessel section 6 above the lower vessel section 8. Such phraseology is intended to encompass some tilt or deviation from a perfectly vertical orientation.

With continuing reference to FIG. 1, the upper vessel section 6 contains steam generators 24 disposed inside the cylindrical pressure vessel. In the illustrative example, the steam generators 24 are entirely in the upper vessel section 6, and do not extend into the mid-flange 10 or lower vessel section 8. The steam generators 24 are not illustrated in detail, but can have various configurations, such as a helical configuration (see Thome et al., U.S. Pub. No. 2010/0316181 A1 which is incorporated herein by reference in its entirety), a once-through straight-tube steam generator (OTSG) configuration optionally including a lower internal economizer portion, or so forth. The steam generators 24 are internal to the pressure vessel, and the PWR is referred to as an integral PWR. In the illustrative embodiment, the steam generators 24 are secured to the upper vessel section 6 such that the upper vessel section 6 and the steam generators 24 can be lifted as a unit (once the bolts or other fasteners securing the upper vessel section 6 to the mid-flange 10 are detached). Because the steam generators 24 are entirely in the upper vessel section 6, and do not extend into the mid-flange 10 or lower vessel section 8, the upper vessel/steam generators unit does not need to be raised to any particular height to lift the steam generators out of the lower vessel before moving the lifted assembly laterally.

The illustrative upper vessel section 6 also includes an uppermost portion 26 that defines an internal pressurizer and may include pressure control components such as spargers, resistive heaters, or so forth. Alternatively, an external pressurizer may be provided and operatively connected with the pressure vessel via suitable piping in order to control pressure inside the pressure vessel. It is to be understood that the pressure vessel of the integral PWR contains a reactor core 30 comprising fissile material such as $^{235}$U disposed inside the cylindrical pressure vessel in the lower vessel section 8, and preferably at or near the bottom of the lower vessel section 8. It is to be further understood that the pressure vessel of the integral PWR contains primary coolant water in a subcooled state that fills the interior volume of the pressure vessel, except for a steam bubble in the internal pressurizer volume 26 (this steam bubble is also primary coolant water, but in a steam state). The primary coolant water flows in a circuit including a "hot leg" that flows upward from the reactor core 30, rises through the central riser, discharges from the upper end of the upper riser section 12; the discharged primary coolant water then flows through a return "cold leg" through a downcomer annulus defined between the central riser and the inner cylindrical surface of the pressure vessel. In the illustrative integral PWR, the cold leg includes the steam generators 24, and the primary coolant flows downward through steam generator tubes (i.e., flows "tube-side") or alternatively flows downward along the outsides of the tubes (i.e., flows "shell-side"). The primary coolant in the cold leg flows downward to the bottom of the central riser where it again reverses direction and re-enters the reactor core 30 to complete the primary coolant flow circuit. In the illustrative example of FIG. 1, feedwater is flowed upward through the steam generators 24, either shell-side (if the primary coolant flows tube-side) or tube-side (if the primary coolant flows shell-side). Heat from the primary coolant in the steam generators 24 heats the feedwater converting it to steam. Feedwater inlets and steam outlets and optional feedwater and steam plenums (features not shown) are provided to flow feedwater into the steam generators 24 and to extract the steam from the steam generators 24.

Primary coolant flow circulating through the hot and cold legs is via natural convection driven by heat output by the reactor core 30. Optionally, reactor coolant pumps (RCPs) are provided to assist or drive the primary coolant flow. In illustrative FIG. 1, RCPs 32 are disposed near the top of the upper vessel section 6. The illustrative RCP 32 has a pump motor 34 located externally from the pressure vessel, and a driveshaft 36 passes through a vessel penetration in the upper vessel section 6 to operatively connect the motor 34 with an impeller 38 engaging the primary coolant inside the pressure vessel. The RCPs 32 may optionally include or be associated with further components (not shown), such as a pump housing surrounding the impeller 38 to define the pump flow, a pump plate separating the suction and discharge sides of the impeller 38, and so forth. The illustrative RCPs 32 are secured to the upper vessel section 6 such that the upper vessel section 6, the RCPs 32, and (as mentioned before) the steam generators 24 can be lifted as a unit (again, after bolts or other fasteners securing the upper vessel section 6 to the mid-flange 10 are detached).

The illustrative RCPs 32 of FIG. 1 are an example. More generally, RCPs can be mounted elsewhere. See, for example, FIGS. 6 and 7 (discussed elsewhere herein) which illustrate RCPs located proximate to the mid-flange 10.

With continuing reference to FIG. 1 and with further reference to FIGS. 2-5, an "upper internals" section of the nuclear reactor is further described. The upper internals include control rod drive mechanism (CRDM) units 40 controlling control rod insertion into the reactor core 30, and guide frames 42 guiding control rods into the reactor core 30. The guide frames 42 are located directly above the reactor core 30 in order to guide the control rods vertically into or out of the reactor core 30; accordingly, the guide frames 42 are located inside the central riser. The illustrative integral PWR employs internal CRDM units 40 which are located inside the pressure vessel, and are also located inside the central riser to engage the control rod assemblies. The illustrative CRDM units 40 are disposed inside the cylindrical pressure vessel above the reactor core 30 and in the lower vessel section 8. There is no vertical overlap between the upper vessel section 6 and the CRDM units 40, and there is no vertical overlap between the steam generators 24 and the CRDM units 40. With this configuration the CRDM units 40 are entirely inside the lower pressure vessel 8, and the CRDM units 40 therefore do not impede lift off of the upper vessel section 6 with its secured steam generators 24. In other words, the upper vessel section 6 and the steam generators 24 do not need to be lifted vertically to clear the CRDM units 40.

Moreover, with particular reference to FIGS. 2-5, the upper internals are designed to be suspended from the mid-flange 10. In this way, the mid-flange 10 can be lifted out of the lower vessel section 8 (after removal of the upper vessel section 6) with the riser transition section 16 connected and with the upper internals suspended from the mid-flange 10 (see particularly FIGS. 4 and 5). This assembly can be lifted as a unit out of the lower vessel section 8, and moved laterally to an upper internals bay located inside containment for inspection or maintenance. The overhead suspension of the upper internals from the mid-flange 10 provides stable support that is not susceptible to tilting. Lifting out the upper internals in this way also provides unimpeded access from above to the reactor core 30 for refueling, fuel inspection or maintenance.

Toward this end, the riser transition section 16 is connected to the mid-flange 10 in a secure fashion to provide an anchor for the suspended upper internals. In the illustrative embodiment, the riser transition section 16 is welded to the mid-flange 10 by welding the upper ends of the gussets 20 to the inner diameter of the mid-flange 10 and welding the lower ends of the gussets 20 to the riser transition section 16. A CRDM support plate 44 and a lower hanger plate 46 are suspended from the riser transition section 16 by tie rods 48, 50. In the illustrated configuration, tie rods 48 have lower ends connected with the CRDM support plate 44 and upper ends connected with the riser transition section 16 so that the CRDM support plate 44 is suspended indirectly from the mid-flange 10 via the riser transition section 16 and the gussets 20. Lower tie rods 50 then suspend the lower hanger plate 46 from the CRDM support plate 44. In this approach the riser transition section 16 is a weight-bearing member that supports the CRDM support plate 44 and the lower hanger plate 46.

Alternatively, the upper ends of the tie rods 48 can be welded or otherwise connected directly to the gussets 20, with the tie rods passing through slots or holes in the riser transition section 16. To prevent mixing of primary coolant from the hot and cold legs, the slots or holes in the riser transition section 16 are suitably closed, for example by weldments that also secure the riser transition section 16 to the gussets 20. In this approach the riser transition section 16 is not a weight-bearing member.

In another variation, the tie rods 48 and lower tie rods 50 can be constructed as continuous single-piece tie rods having their lower ends connected with the lower hanger plate 46 and their upper ends connected with the riser transition section 16 or directly with the gussets 20. In this variation, the CRDM support plate 44 connects with the continuous single-piece tie rods at a designated location along the length of the tie rods, i.e. at a designated location between the upper and lower ends of the tie rods.

In yet another contemplated variation, the tie rods 48 (or alternatively the continuous single-piece tie rods as previously described) have their upper ends connected directly with the mid-flange 10. In this case the tie rods are at a slight angle respective to the vertical in order to accommodate the larger inner diameter of the mid-flange 10 compared with the inner diameter of the central riser. In this embodiment the riser transition section would not be a weight-bearing member, but would have slots or holes for the tie rods to pass through.

Figure 2:
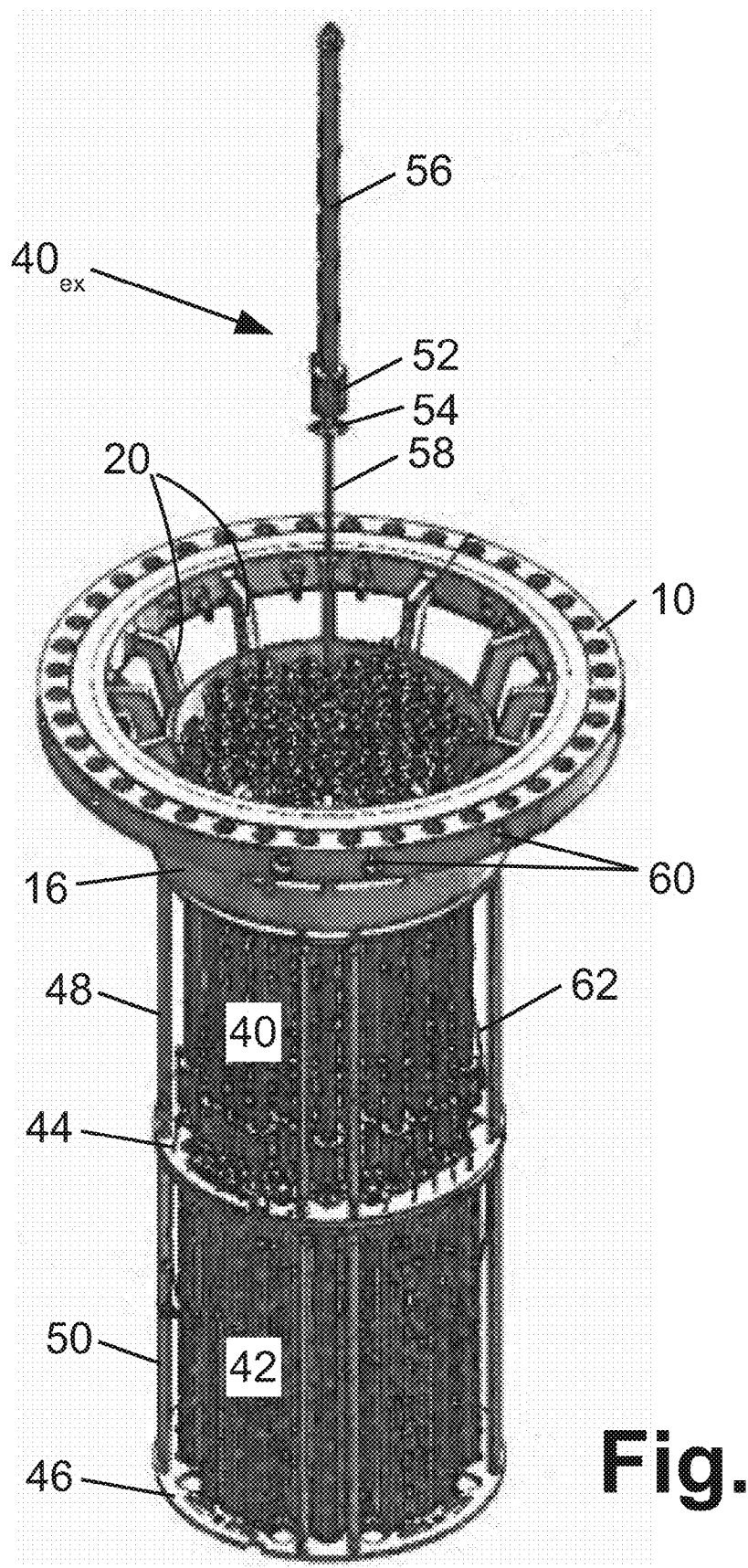
FIGS. 2 and 3 show perspective and side views, respectively, of the mid-flange and the suspended upper internals of the integral PWR of FIG. 1.
Figure 3:
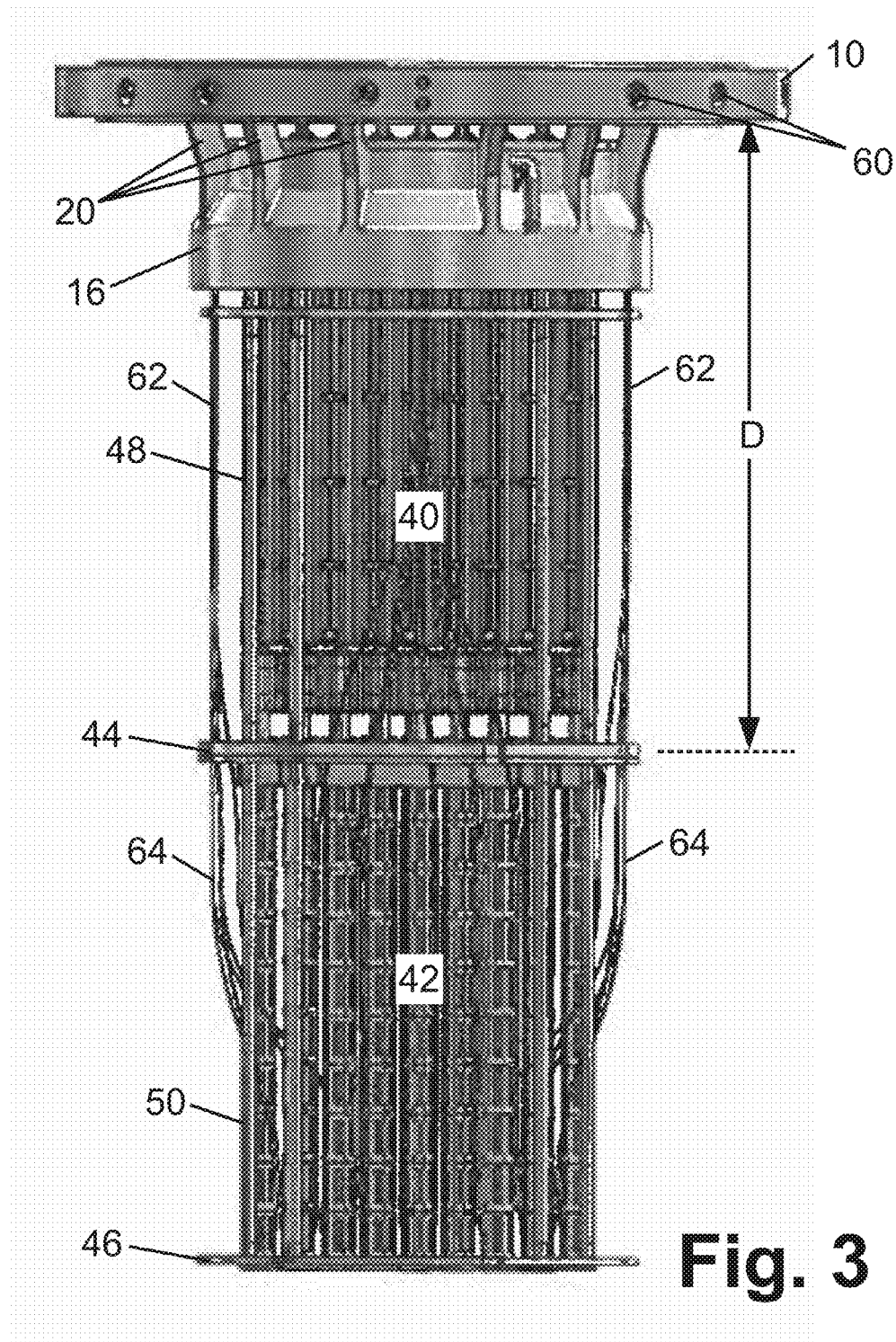

With brief reference to FIG. 2, the CRDM units 40 each include a CRDM motor 52, a standoff 54, and a latch mechanism 56. In FIG. 2, a single CRDM unit $40_{ex}$ is shown in an "exploded" view, that is, removed from the overall assembly, in order to show the CRDM motor 52, standoff 54, and latch mechanism 56. The CRDM standoff 56 mounts to the CRDM support plate 44 to support the CRDM unit with the CRDM motor 52 at a designated height. The CRDM motor 52 operates directly or indirectly to raise or lower a connecting rod 58 that is attached to a set of control rods via a spider (control rods and spider not shown). The assembly of the connecting rod, spider, and set of control rods is sometimes referred to as a control rod assembly (CRA). In normal operation, the CRDM motor 52 raises or lowers the CRA to insert or withdraw the constituent control rods into or from the reactor core 30. In the event of a SCRAM, the latch mechanism 56 releases the connecting rod 58 to allow the CRA to fall under force of gravity toward the reactor core 30 so as to rapidly insert the control rods fully into the reactor core 30. The CRDM unit $40_{ex}$ of FIG. 2 conforms with embodiments disclosed in Stambaugh et al., U.S. Pub. No. 2010/0316177 A1; Desantis, U.S. Pub. No. 2011/0222640 A1; and Stambaugh et al., WO 2010/144563 A1, each of which is incorporated herein by reference in its entirety. In these embodiments, the CRDM motor 52 operates on a lead screw and the upper end of the control rod is electrically or hydraulically latched with the lead screw by the latch mechanism 56. In a SCRAM the latch mechanism 56 releases to SCRAM the CRA including the connecting rod 58, but not including the lead screw. The CRDM unit $40_{ex}$ is optionally replaced by a more conventional CRDM unit in which the latch is omitted and SCRAM is initiated by opening a separable roller nut of the CRDM motor that connects with the lead screw, such that the CRA and the lead screw SCRAM together, or by a CRDM unit employing a ratchet mechanism to raise/lower the CRA.

In any of these cases, it will be appreciated that when the control rods are fully withdrawn the connecting rod will extend well above the CRDM motor, and the CRDM unit should have sufficient height above the CRDM motor to accommodate this. In the disclosed approaches, the CRDM support plate 44 is suspended below the mid-flange 10 by a distance D (labeled only in FIG. 3) that is sufficient that the tops of the CRDM units 40 including the latch mechanism 56 (or, in other CRDM unit embodiments, including the upper housing or support for the connecting rod/lead screw) are located below the mid-flange 10, that is, so that the CRDM units 40 are disposed entirely in the lower vessel section 8. The CRDM units 40 have no vertical overlap with the upper vessel section 6 and have no vertical overlap with the steam generators 24.

The gussets 20 support the weight of the upper internals (except in the contemplated variation in which the tie rods connect directly with the mid-flange). The gussets 20 are also substantially rigid components that locate the riser transition section 16 inside the pressure vessel. During temperature ramp-up as the reactor is started, and subsequent temperature ramp-down prior to a vessel opening, the various components undergo substantial temperature transients and, if different materials are used, some differential thermal expansion may be experienced. The illustrative gussets 20 are advantageously shaped to help accommodate differential thermal expansion by being angled downward such that the riser transition section 16 is disposed below the mid-flange 10. This allows the accommodation of any differential thermal expansion to be distributed in both vertical and lateral directions.

As already discussed, the disclosed configurations advantageously enable the upper internals to be removed as a unit suspended below the mid-flange 10. To further facilitate this modularity and ease of removal of the upper internals, in some embodiments power delivery cabling is also integrated into this assembly. Toward this end, the power delivery cabling may include electrical feedthroughs 60 passing through the mid-flange 10, and mineral insulated (MI) cables 62 extending from the electrical feedthroughs 60 to the CRDM units 40 to conduct electrical power to the CRDM units 40. Additionally or alternatively, some or all of the feedthroughs 60 may be hydraulic feedthroughs passing through the mid-flange 10, and the cables 62 may correspondingly be hydraulic cables extending from the hydraulic feedthroughs 60 to the CRDM units 40 to conduct hydraulic power to the CRDM units 40. (Note, the power delivery cabling components 60, 62 are labeled only in FIGS. 2 and 3). Optionally, additional cabling 64 (labeled only in FIG. 3) may extend to the reactor core 30 to connect with in-core sensors (not shown). The MI or hydraulic cables 62 are relatively rigid and are suitably secured to structural elements of the mid-flange/upper internals assembly in order that the cables 62 can be lifted out with the assembly without disconnecting the cables from either the CRDM units 40 or the mid-flange feedthroughs 60. For example, the cables may be secured to the riser transition section 16 and/or to the tie rods 48 and/or to the CRDM support plate 44. In some embodiments, portions of the MI and/or hydraulic cables 62 that run along the CRDM support plate 44 are embedded in or secured to the CRDM support plate 44 such that the CRDM support plate 44 is a power distribution plate for laterally distributing electrical and/or hydraulic power to the CRDM units 40 supported by the plate 44. It is contemplated to similarly use the lower hanger plate 46 to laterally distribute MI cables connecting with in-core sensors of the array of fuel assemblies making up the reactor core 30.

With reference to FIGS. 4 and 5, removal of the upper internals is illustrated. FIG. 4 shows the lower vessel section 8 and the mid-flange 10 which remain after the upper vessel section 6 has been removed. FIG. 5 shows the mid-flange 10 raised vertically to lift the suspended upper internals (i.e., the CRDM units 48 and guide frames 50 supported respectively by the CRDM support plate 44 and lower hanger plate 46) out of the lower vessel section 8. The lifted assembly can then be moved laterally (not illustrated) to provide overhead access to the reactor core 30 via a large opening 66 exposed at the top of the lower vessel section 8.

Figure 6:
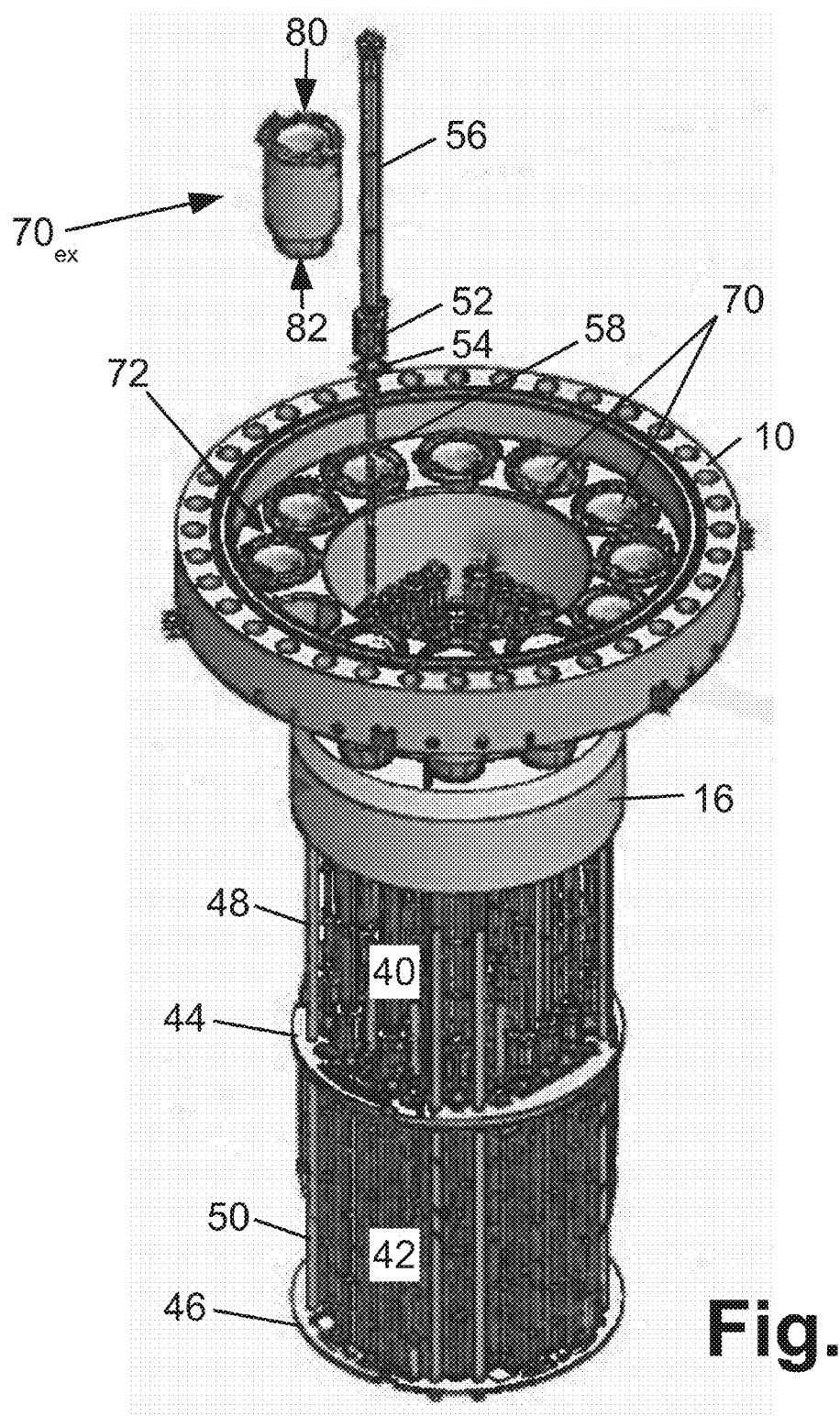
FIGS. 6 and 7 show perspective and side views, respectively, of the mid-flange and the suspended upper internals of the integral PWR of FIG. 1 for an alternative embodiment in which the reactor coolant pumps (RCPs) shown in FIG. 1 are replaced by internal RCPs mounted at the mid-flange.
Figure 7:
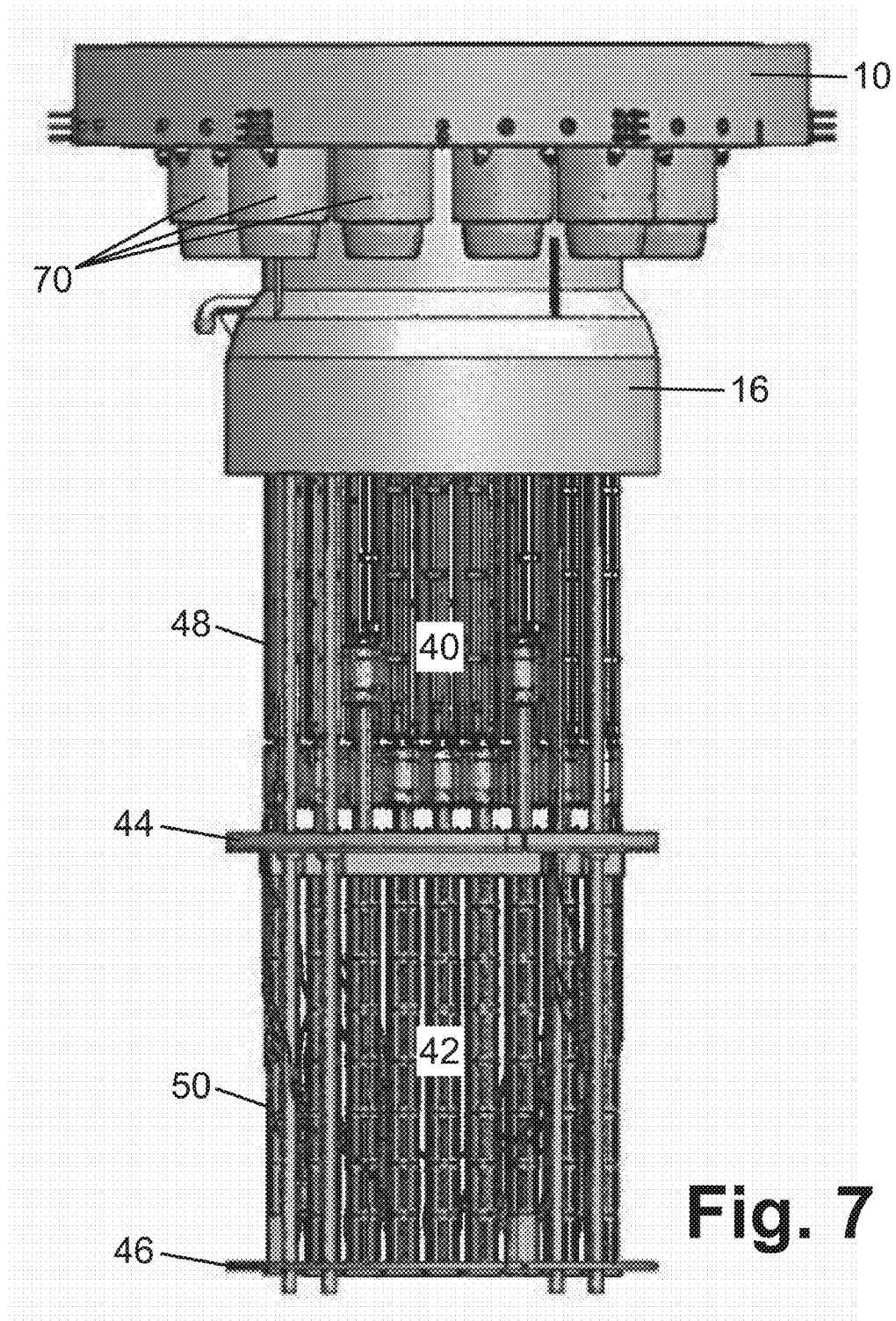

With reference to FIGS. 6 and 7, an alternative embodiment is shown, in which the RCP's 32 mounted on the upper vessel section 6 proximate to the internal pressurizer 26 are replaced by RCPs 70 that are disposed entirely inside the cylindrical pressure vessel. The RCPs 70 are mounted on an annular pump plate 72 that has an outer circular perimeter connecting with the mid-flange 10 and an inner circular perimeter connected with the riser transition section 16. In some embodiments the outer and inner circular perimeters of the annular pump plate 72 are welded to the mid-flange 10 and the riser transition section 16, respectively. In such embodiments, the annular pump plate 72 can replace the structural function of the gussets 20, that is, the annular pump plate 72 supports the upper internals. (Alternatively, the gussets 20 can be retained, in which case the annular pump plate supports the RCPs 70 but not the upper internals). The annular pump plate 72 supports the RCPs 70 and also provides separation between the suction and discharge sides of the RCPs 70. In FIG. 6, a single RCP $70_{ex}$ is shown in an "exploded" view, that is, removed from the overall assembly, in order to show it in more detail. The RCP $70_{ex}$ has a suction side 80 and a discharge side 82. The RCP $70_{ex}$ can be substantially any type of canned pump.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
a cylindrical pressure vessel including an upper vessel section, a lower vessel section, and a mid-flange, the upper vessel section and the lower vessel section being joined by the mid-flange;
a cylindrical central riser disposed concentrically inside the cylindrical pressure vessel and including an upper riser section disposed in the upper vessel section and a lower riser section disposed in the lower vessel section;
a reactor core comprising fissile material disposed inside the cylindrical pressure vessel in the lower vessel section;
control rod drive mechanism (CRDM) units controlling control rod insertion actively into the reactor core, the CRDM units being disposed inside the cylindrical pressure vessel above the reactor core and in the lower vessel section with no vertical overlap between the upper vessel section and the CRDM units;
a riser transition section disposed between the upper riser section and the lower riser section, the riser transition section being connected to the mid-flange by gussets having first ends welded to the mid-flange and second ends welded to the riser transition section, the gussets being angled downward such that the riser transition section is disposed below the mid-flange;
a CRDM support plate disposed below the riser transition section and supporting the CRDM units; and
tie rods suspending the CRDM support plate from the mid-flange.

2. The apparatus of claim 1, further comprising:
steam generators disposed inside the cylindrical pressure vessel and entirely in the upper vessel section.

3. The apparatus of claim 2, wherein the steam generators are secured to the upper vessel section such that the upper vessel section and the steam generators can be lifted as a unit.

4. The apparatus of claim 1, wherein upper ends of the tie rods connect with the riser transition section to suspend the CRDM support plate from the mid-flange via the riser transition section and the gussets.

5. The apparatus of claim 1, further comprising:
guide frames disposed between the CRDM units and the reactor core and guiding control rods into the reactor core;
a lower hanger plate supporting the guide frames; and
lower tie rods suspending the lower hanger plate from the CRDM support plate.

6. The apparatus of claim 1, further comprising:
guide frames disposed between the CRDM units and the reactor core and guiding control rods into the reactor core; and
a lower hanger plate supporting the guide frames; and
wherein the tie rods further connect with the lower hanger plate such that the lower hanger plate is also suspended from the mid-flange by the tie rods.

7. The apparatus of claim 1, further comprising:
power delivery cabling including at least one of:
(1) a plurality of electrical feedthroughs passing through the mid-flange and mineral insulated (MI) cables extending from the electrical feedthroughs to the CRDM units to conduct electrical power to the CRDM units; and
(2) a plurality of hydraulic feedthroughs passing through the mid-flange and hydraulic cables extending from the hydraulic feedthroughs to the CRDM units to conduct hydraulic power to the CRDM units.

8. The apparatus of claim 7, wherein at least one of MI cables and hydraulic cables of the power delivery cabling are embedded in or secured to the CRDM support plate such that the CRDM support plate is a power distribution plate.

9. The apparatus of claim 1, further comprising:
an annular pump plate having an outer circular perimeter connecting with the mid-flange and an inner circular perimeter connected with the riser transition section; and
reactor coolant pumps disposed entirely inside the cylindrical pressure vessel and mounted on the annular pump plate.

10. The apparatus of claim 1, further comprising:
reactor coolant pumps mounted on the upper vessel section.

11. An apparatus comprising:
a cylindrical pressure vessel including an upper vessel section, a lower vessel section, and a mid-flange, the upper vessel section and the lower vessel section being joined by the mid-flange;
a cylindrical central riser disposed concentrically inside the cylindrical pressure vessel and including an upper riser section disposed in the upper vessel section, a lower riser section disposed in the lower vessel section, and a riser transition section disposed between the upper riser section and the lower riser section, the riser transition section being connected to the mid-flange;
a reactor core comprising fissile material disposed inside the cylindrical pressure vessel in the lower vessel section;
control rod drive mechanism (CRDM) units controlling control rod insertion actively into the reactor core, the CRDM units being disposed inside the cylindrical pressure vessel above the reactor core and in the lower vessel section with no vertical overlap between the upper vessel section and the CRDM units;
a CRDM support plate disposed below the riser transition section and supporting the CRDM units; and
tie rods suspending the CRDM support plate from the mid-flange.

12. The apparatus of claim 11, further comprising:
steam generators disposed inside the cylindrical pressure vessel and entirely in the upper vessel section.

13. The apparatus of claim 12, wherein the steam generators are secured to the upper vessel section such that the upper vessel section and the steam generators can be lifted as a unit.

14. The apparatus of claim 11, further comprising:
gussets connecting the riser transition section to the mid-flange, the gussets having first ends welded to the mid-flange and second ends welded to the riser transition section.

15. The apparatus of claim 14, wherein the gussets connecting the riser transition section to the mid-flange are angled downward such that the riser transition section is disposed below the mid-flange.

16. The apparatus of claim 11, wherein upper ends of the tie rods connect with the riser transition section to suspend the CRDM support plate from the mid-flange via the riser transition section and the gussets.

17. The apparatus of claim 11, further comprising:
guide frames disposed between the CRDM units and the reactor core and guiding control rods into the reactor core;
a lower hanger plate supporting the guide frames; and
lower tie rods suspending the lower hanger plate from the CRDM support plate.

18. The apparatus of claim 11, further comprising:
guide frames disposed between the CRDM units and the reactor core and guiding control rods into the reactor core; and
a lower hanger plate supporting the guide frames; and
wherein the tie rods further connect with the lower hanger plate such that the lower hanger plate is also suspended from the mid-flange by the tie rods.

19. The apparatus of claim 11, further comprising:
an annular pump plate having an outer circular perimeter connecting with the mid-flange and an inner circular perimeter connected with the riser transition section; and
reactor coolant pumps disposed entirely inside the cylindrical pressure vessel and mounted on the annular pump plate.

20. The apparatus of claim 11, further comprising:
reactor coolant pumps mounted on the upper vessel section.

* * * * *